United States Patent
Jiao

(10) Patent No.: US 11,336,337 B2
(45) Date of Patent: May 17, 2022

(54) ANTENNA SWITCHING BASED MIMO SCHEME FOR IOT

(71) Applicants: Universiteit Gent, Ghent (BE); IMEC VZW, Leuven (BE)

(72) Inventor: Xianjun Jiao, Ghent (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 0 days.

(21) Appl. No.: 17/245,238

(22) Filed: Apr. 30, 2021

(65) Prior Publication Data

US 2021/0359730 A1 Nov. 18, 2021

(30) Foreign Application Priority Data

May 13, 2020 (EP) .................................... 20174535

(51) Int. Cl.
*H04B 7/06* (2006.01)
*H04B 7/0452* (2017.01)
*H04B 7/0456* (2017.01)

(52) U.S. Cl.
CPC ......... *H04B 7/0452* (2013.01); *H04B 7/0456* (2013.01); *H04B 7/0602* (2013.01)

(58) Field of Classification Search
CPC ... H04B 1/38; H04B 7/04; H04B 7/06; H04B 7/08; H04B 7/0408; H04B 7/0452; H04B 7/0456; H04B 7/0602; H04J 11/00; H04L 1/00; H04L 5/00; H04L 5/10; H04L 25/02; H04L 25/03; H04L 27/38; H04W 4/00;

(Continued)

(56) References Cited

U.S. PATENT DOCUMENTS

2012/0243584 A1 9/2012 Honda et al.
2013/0094544 A1* 4/2013 Moshfeghi ........... H04B 7/0413
375/219

(Continued)

FOREIGN PATENT DOCUMENTS

WO 2008007947 A1 1/2008

OTHER PUBLICATIONS

Extended European Search Report from corresponding EP Application No. EP20174535.3, dated Oct. 9, 2020.

(Continued)

*Primary Examiner* — Shawkat M Ali
(74) *Attorney, Agent, or Firm* — Workman Nydegger

(57) ABSTRACT

A multi-user access node for receiving concurrent signals which are carrying redundant chip sequences at a baseband rate, the access node including: a plurality of antennas organized in an antenna configuration; a main transceiver comprising an analog receiver and an ADC for converting an incoming signal into a digital signal which comprises the incoming chip sequences; a switch for switching the transceiver between the plurality of antennas; a controller configured for: initializing the multi-user access node by switching the transceiver between the plurality of antennas to capture a spatial character of the different users based on unique initialization chip sequences from the different users, separating collided chip sequences transmitted by different users by switching the transceiver between the plurality of antennas according to a scrambling sequence and by using the spatial character in combination with the applied scrambling sequence.

15 Claims, 11 Drawing Sheets

(58) Field of Classification Search
CPC ..... H04W 24/10; H04W 72/04; H04W 72/12; H04W 74/00; H04W 74/08; H04W 76/27
USPC ........ 370/252, 329; 375/219, 260, 267, 295, 375/316; 455/41.2
See application file for complete search history.

(56) References Cited

U.S. PATENT DOCUMENTS

| | | | |
|---|---|---|---|
| 2015/0156786 A1* | 6/2015 | Kim | H04W 52/243 370/329 |
| 2015/0358064 A1* | 12/2015 | Benjebbour | H04B 7/065 370/329 |
| 2018/0287828 A1 | 10/2018 | Tavares et al. | |
| 2020/0077402 A1 | 3/2020 | Lei et al. | |
| 2021/0212114 A1* | 7/2021 | Chen | H04W 72/1247 |

OTHER PUBLICATIONS

Liu et al., "Non-Orthogonal Multiple Access for 5G and Beyond," Proceedings of the IEEE, Aug. 1, 2018, 65 pages.

Jiao et al., "An Antenna Awitching Based NOMA Scheme for IEEE 802.15.4 Concurrent Transmission," 2020 IEEE 91st Vehicular Technology Conference, May 25-28, 2020, 5 pages.

\* cited by examiner

ANTENNA SWITCHING BASED MIMO SCHEME FOR IOT

FIELD OF THE INVENTION

The invention relates to the field of multi-user access nodes. More specifically it relates to a multi-user access node which supports concurrent reception of signals in a multiple input multiple output (MIMO) system.

BACKGROUND OF THE INVENTION

The number of nodes in Internet of Things (IoT) technology is ever increasing. Nodes sharing the same spectrum (e.g. the ISM band) have to follow some MAC (Media Access Control) mechanism, such as CSMA (Carrier Sensing Multiple Access) and TDMA (Time Division Multiple Access), to avoid collision when they work in the same frequency channel. CSMA and TDMA MAC actually achieve time sharing of the same channel among many nodes, which means nodes have to transmit one after the other. When the channel is very busy, the node will suffer a lot on data rate and latency. An increased number of nodes sharing the single channel capacity will result in a decreased data rate. An increase latency occurs for busy channels because transmission needs to be postponed until the channel becomes idle.

In some prior art solutions concurrent transmission is proposed based on a fact of IEEE 802.15.4 (referred to as Zigbee): even when two packets are overlapping/colliding with each other, a receiver could still have a big chance to decode both packets correctly if their relative receiving power is close to each other. By living with collision, a C-MAC (Concurrent Media Access Control) is proposed in to increase the system capacity and lower the latency.

To achieve concurrent transmission in the same channel (center frequency), SDMA (Spatial Division Multiple Access) or multi-antenna is another effective way. MIMO (Multiple Input Multiple Output) is the technical framework of utilizing this spatial dimension. MIMO has been the key technology in 4G/LTE, 5G, Wi-Fi and future wireless communication systems. To increase the system capacity and lower the latency, a multi-antenna scheme is proposed for IoT system, such as IEEE 802.15.4 and Wi-Fi.

Traditional MIMO hardware has the same number of RF/analog chains as the number of antennas. When the number of antennas increases, such as up to 32 or 64 in a massive MIMO system, the related massive RF chains bring significant cost, power consumption and weight. This becomes a big challenge for massive MIMO systems. To solve this problem, many antenna selection schemes are developed to having less RF chains than antennas, such as analog/hybrid beamforming.

Multi-user concurrent transmission may be implemented using a CDMA (Code Division Multiple Access) system. SIC (Successive Interference Cancellation) architecture may be used as MUD (Multi-User Detector) to detect superposed multi-user CDMA signals. NOMA (Non-Orthogonal Multiple Access) was proposed as part of 5G technology based on the SIC concept originated from CDMA MUD. In such a mobile network NOMA design, user group, beamforming weights and transmission power of multiple users needs to be allocated carefully to ensure SIC works optimally. In some prior art solutions SIC may be assisted by FEC (Forward Error Correction) decoding to increase the success rate of correct signal reconstruction. In some prior art solutions NOMA may be introduced to the slotted Aloha MAC protocol together with beamforming for massive machine communication in an IoT network. In such solutions multi-user concurrent capability of NOMA is combined with potential collision/packet-overlapping in Aloha MAC to achieve higher capacity of IoT network.

Typical MIMO IoT systems suffer from a high cost, power consumption and weight of multiple parallel RF/analog chains.

There is therefore a need for multiple access architectures with a reduced number of RF/analog chains compared to the number of antennas.

Typical MIMO IoT systems also suffer from severe interference during concurrent transmission of multiple nodes especially when the receiving power of different nodes is similar. When the power difference between receiving signals is big, SIC can always work from the strongest signal (weak signals can be regarded as interferences). But it is difficult for SIC to work with similar receiving power of different signals without the aid of FEC (for lower power IoT standard, FEC is less used). An algorithm needs to be designed to make sure successful decoding with acceptable complexity.

These multiple access architectures should, moreover, support transparent operation for legacy IoT nodes. Unlike in mobile communication (2G/3G/4G/5G/6G), where user terminal hardware is upgraded every year, an IoT node is expected to work for many years. A transparent MIMO system operation mode, that only needs a new gateway, will be an attractive solution to boost performance of IoT network composed with already massively deployed IoT nodes. This means that complicated power-control/scheduling/feedback/measurement mechanism, that exist in mobile network but not in IoT network, should be avoided as much as possible. Because these mechanism needs extra signaling/protocol for IoT node to execute.

SUMMARY OF THE INVENTION

It is an object of embodiments of the present invention to provide a good multi-user access node and method for receiving and separating concurrent signals from different users.

The above objective is accomplished by a method and device according to the present invention.

In a first aspect embodiments of the present invention relate to a multi-user access node for receiving concurrent signals from different users. The signals are carrying chip sequences at a baseband rate and redundancy is present in the chip sequences.

The multi-user access node comprises:
a plurality of antennas organized in an antenna configuration,
a main transceiver comprising an analog receiver and an analog to digital converter for converting an incoming signal into a digital signal which comprises the incoming chip sequences,
a switch for switching the transceiver between the plurality of antennas,
a controller configured for:
initializing the multi-user access node by switching the transceiver between the plurality of antennas to capture a spatial character of the different users based on unique initialization chip sequences from the different users,
separating collided chip sequences transmitted by different users by switching the transceiver between the plurality of antennas according to a scrambling sequence and by using the spatial character of the different users in combination with the applied scrambling sequence.

It is an advantage of a multi-user access node according to embodiments of the present invention that it can be used to separate signals of different users (e.g. IoT users) so that multi-user concurrent transmission in the same frequency channel is achieved.

It is an advantage of embodiments of the present invention that the capacity of the network can be increased without having an impact on the nodes and without the need for having a transceiver per additional antenna. Traditionally when trying to increase the capacity this is achieved by adding antenna/transceiver pairs which are used co-currently. Each time a new channel is added when adding an antenna/transceiver pair.

In the present invention a single channel is used and the throughput is increased by exploiting the native redundancy of the packets. This is particularly advantageous because, for example in the ISM domain, the availability of channels is often quite limited.

In a prior art system, when the signal is transmitted a typical transceiver signal goes through one antenna. In the present invention, on the contrary, when transmitting, the signal goes through multiple antennas via antenna switching. Typically, user nodes are located at different positions. So, the spatial scrambling pattern between antennas is seen differently by the different nodes. The signal differs from node to node in both amplitude and delay. From an antenna array to a specific node there will be n amplitudes and n delays wherein n is the number of antennas. In a typical scenario wherein, the nodes are on different locations this will result in differing amplitudes/delays between the nodes. Even if a same signal is sent out via the same antenna array a different delay and amplitude will be seen at the different nodes and vice versa. Also signals from different nodes have a different signature. In embodiments of the present invention this delay and amplitude sequence acts as a signature sequence or scrambling sequence. Thus, different phase signature sequences will be obtained for different users. In this way the original chip sequence will be transformed to a new chip sequence. The new chip sequence is the spatial sequence multiplied with the original chip sequence.

In embodiments of the present invention the switching is done at the baseband rate.

It is an advantage of embodiments of the present invention that the switching is done at the baseband rate. Thus, off-channel interference can be filtered out and multichannel interference can be avoided.

In embodiments of the present invention the multi-access node comprises a reference receive chain, comprising a reference antenna and a reference transceiver which is permanently connected with the reference antenna. The reference transceiver comprises an analog receiver and an analog to digital converter for converting an incoming signal into a digital signal.

It is an advantage of embodiments of the present invention that the reference antenna can be used for signalization channel estimation.

In embodiments of the present invention at least one transceiver comprises a transmit chain, wherein the transmit chain at least comprises a digital to analog converter for converting a digital signal (which comprises a modulated chip sequence) into an analog signal and a transmitter for transmitting the analog signal and a time division duplexing switch for either connecting the transmitter or the receiver to the antenna.

In embodiments of the present invention the controller is configured for generating a time division duplexing control signal for controlling the time division duplexing switch.

In embodiments of the present invention the multi-user access node comprises a multi-user modulator configured for receiving a chip sequence for the different users and for modulating the signal and for sending the modulated signal to the digital to analog converter of the at least one transceiver.

In embodiments of the present invention the multi-user access node comprises a multi-user demodulator configured for receiving the digital signal from the analog to digital converter of at least one of the transceivers and for demodulating the digital signal.

In embodiments of the present invention the controller is configured for separating collided chip sequences by correlating the incoming chip sequences with scrambled versions of the original chip sequences, wherein the scrambled versions are obtained from the spatial character and the applied scrambling sequence.

In embodiments of the present invention the transmit chain comprising a pre-coding module configured for applying an inverse operation before transmitting the analog signal such that the spatial character of the different users is compensated for.

In embodiments of the present invention capturing the spatial character of the different users implies determining complex gains of channels between the users and the antennas.

In embodiments of the present invention the controller is configured for performing an initial procedure to determine the unique initialization chip sequence of each user.

In embodiments of the present invention the controller is configured for determining the unique initialization chip sequence of each user from the digital signal from the reference receive chain.

In embodiments of the present invention the controller is configured for storing data from the main transceiver while determining the unique initialization chip sequence of each user.

In embodiments of the present invention the controller is configured for determining the unique initialization chip sequence of each user from the digital signal from the main transceiver without switching the transceiver, followed by determining the spatial character of the different users by switching the main transceiver between the plurality of antennas.

In embodiments of the present invention the controller is configured for performing successive interference cancellation by subtracting a reconstructed signal of one or more users from the incoming signal.

In a second aspect embodiments of the present invention relate to a method for receiving concurrent signals from different users wherein the signals are carrying chip sequences at a baseband rate and wherein redundancy is present in the chip sequences. The method comprises:
switching a transceiver between a plurality of antennas to capture a spatial character of the different users based on unique initialization sequences from the different users,
separating collided chip sequences transmitted by different users by switching the transceiver between the plurality of antennas according to a scrambling sequence and by using the spatial character of the different users in combination with the applied scrambling sequence.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
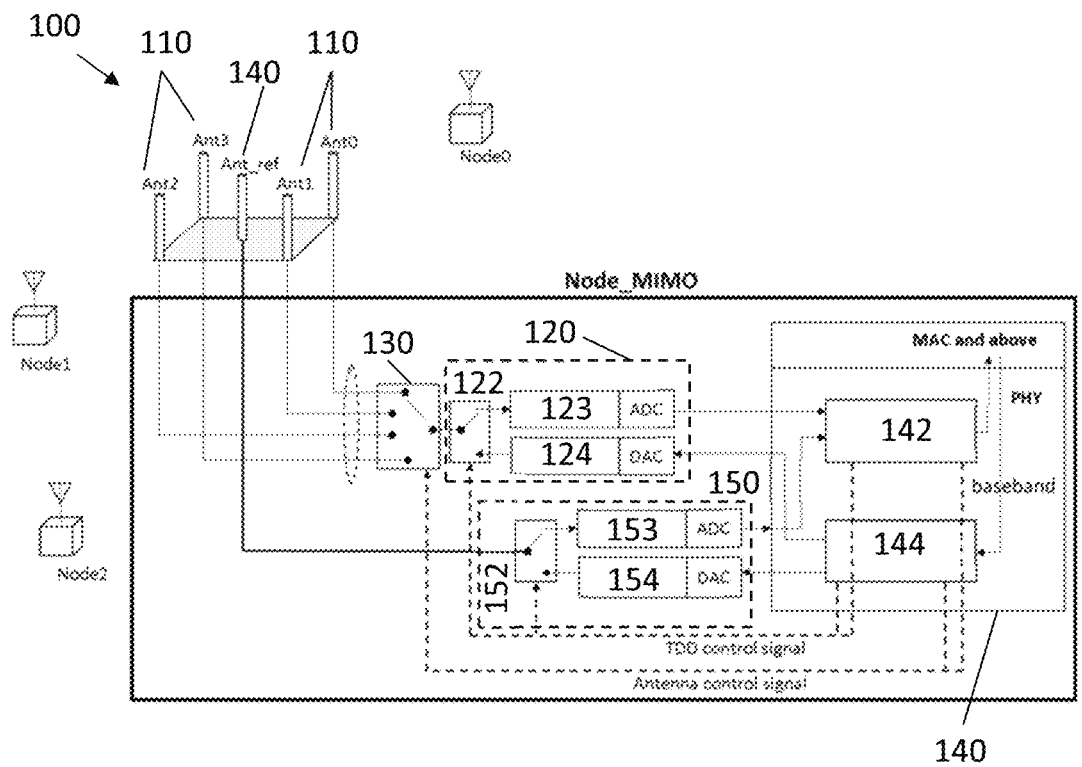
FIG. 1 shows a hardware architecture of an exemplary multi-user access node in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In embodiments of the present invention switching antennas are used to capture the spatial character of different IoT users with much fewer analog transceivers than the number of antennas. The spatial character is used to separate signals of different IoT users so that multi-user concurrent transmission in the same frequency channel is achieved.

In a first aspect embodiments of the present invention relate to a multi-user access node 100. This multi-user access node supports concurrent reception of signals from different users. The signals are carrying chip sequences at a baseband rate and redundancy is present in these chip sequences. The signals can be concurrently transmitted from different users. A multi-user access node, according to embodiments of the present invention, comprises:

a plurality of antennas 110 organized in an antenna configuration, a main transceiver 120, which comprises an analog receiver and an analog to digital converter for converting an incoming signal into a digital signal, wherein the digital signal comprises the chip sequences, a switch 130 for switching the main transceiver 120 between the plurality of antennas, and a controller 140 configured for:

initializing the multi-user access node 100 by switching the main transceiver 120 between the plurality of antennas to capture a spatial character of the different users based on unique initialization chip sequences from the different users, separating collided chip sequences transmitted by different users by switching the transceiver 120 between the plurality of antennas according to a scrambling sequence and by using the spatial character of the different users in combination with the applied scrambling sequence.

A hardware architecture of an exemplary multi-user access node in accordance with embodiments of the present invention is depicted in FIG. 1. In this example the multi-user access node is a MIMO node which is configured for communicating with a plurality of legacy nodes concurrently via the same channel/frequency (in the example there are nodes for users 0, 1, and 2). The MIMO node can therefore act as gateway of a centralized IoT network or as a capable node in a mesh/ad-hoc IoT network.

In embodiments of the present invention the multiple access architecture comprises a reference transceiver 150 which is permanently connected with a reference antenna 140.

In embodiments of the present invention at least one transceiver 120, 150 is a Time Division Duplexing (TDD) transceiver. Such a TDD transceiver comprises a digital to analog converter DAC for converting a digital signal, which comprises a chip sequence, into an analog signal and a transmitter 124, 154 for transmitting the analog signal and a time division duplexing switch 122, 152 for either connecting the transmitter 124, 154 or the receiver 123, 153 to the antenna 110, 140.

In the exemplary embodiment of FIG. 1 both transceivers 120, 150 are TDD transceivers. The reference transceiver 150 is connected with the reference antenna 140 and the main transceiver 120 is connected with the switch 130. The multi-user access node of FIG. 1 is equipped with 5 antennas. The reference antenna 140 is connected to a reference transceiver 150. This reference transceiver 150 comprises a TDD switch 152, an analog receiver 153, an analog transmitter 154, an ADC, and a DAC. The TDD switch 152 connects the receiver 153 or the transmitter 154 with the reference antenna 140. During operation the TDD switch constantly switches between the transmitter and the receiver. The signal from the receiver is AD converted by the ADC. The output of the ADC is connected with the controller 140. The output of the DAC is connected with the transmitter.

In the examples of FIG. 1, four antennas (Ant0-3) form an array that is connected to the TDD switch 122 of the main transceiver 120 via the antenna switch 130.

It is an advantage of embodiments of the present invention that one or two transceivers are sufficient no matter how many antennas there are in total. In some embodiments one transceiver (the reference transceiver 150) is connected to the reference antenna 140 constantly. The other transceiver 120 is connected to switching antennas 110 via the switch 130. Hence, a lot of RF transceivers are saved compared with traditional massive MIMO hardware.

In embodiments of the present invention the controller 140 comprises a multi-user demodulator 142 which is configured for receiving the digital signal from the ADC and for demodulating the digital signal (which is an overlapped/concurrent multi-user packet), and for sending the extracted bits to a MAC layer.

In embodiments of the present invention the controller 140 comprises a multi-user modulator 144. The modulator is configured for receiving a chip sequence for the different users (in the example of FIG. 1 this chip sequence is coming from the Media Access Control layer), for modulating the signal and for sending the modulated signal to the DAC of the main transceiver 120 and/or of the reference transceiver 150.

In embodiments of the present invention the controller 140 is configured for generating a TDD control signal. The TDD control signal determines whether the receiver or transmitter is connected to the antenna, in accordance with the MAC layer which wants to send or receive packets. In embodiments of the present invention the modulator 144 and demodulator 142 may be configured for generating the TDD control signal.

In embodiments of the present invention the controller 140 is configured for generating the antenna control signal. This signal controls which antenna is connected to the main transceiver 120. An example thereof is illustrated in FIG. 1. In this example the modulator 144 and the demodulator 142 are configured for generating the antenna control signal.

In embodiments of the present invention the ADC converts the signal received from the antenna(s) to digital I/Q samples in the baseband domain. The DAC converts the digital I/Q samples from the baseband domain to a signal that is transmitted over the antenna(s).

As only a limited number of RF/analog transceivers are present at a multi-user access node (e.g. a MIMO node), that could act as gateway, a low cost gateway with reduced power consumption and weight can be obtained.

It is an advantage of embodiments of the present invention that a higher capacity and lower latency can be obtained because of concurrent transmission in comparison with architectures which do not support concurrent transmission.

It is an advantage of a multi-user access node 100 according to embodiments of the present invention that it allows transparent operation.

It is an advantage of embodiments of the present invention that a multi-user access node (e.g. a MIMO node) can communicate with a legacy IoT node. If the MIMO node acts as gateway of the IoT network, already deployed legacy IoT nodes do not need to be changed.

In the paragraphs below an exemplary embodiment of the present invention applied to the 802.15.4-2015 standard is used to explain how the invention works. The invention is, however, not limited thereto. Any other system, where the same set of sequences is used for the different users which are randomly accessing the medium, could use this invention to decrease the inter-user interference with limited cost. For example, in the 4G/5G random accessing mechanism (RA) a set of RA sequences is defined for all users to choose randomly during the RA phase. Another example is a GPS system, where a set of pre-known spreading sequences is used by all satellites.

In this example, a legacy non-concurrent transmission transceiver is introduced. The nodes 0, 1 and 2 in FIG. 1 may for example comprise a 802.15.4 legacy transmitter.

Figure 2:
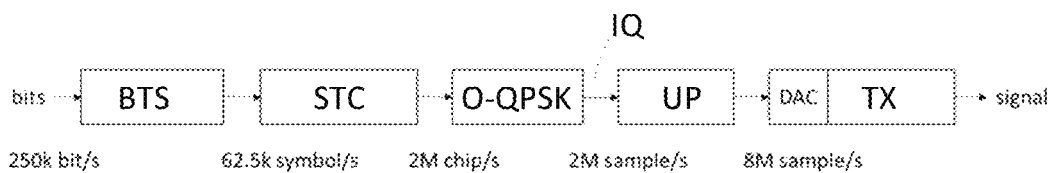
FIG. 2 shows a typical 802.15.4 single user transmitter.

For a 250 kb/s O-QPSK PHY modulation process, a typical single user transmitter executes the steps illustrated in FIG. 2.

First the bits are mapped to symbols (BTS). The 4 least significant bits (b0, b1, b2, b3) of each octet are mapped into one data symbol, and the 4 most significant bits (b4, b5, b6, b7) of each octet arze mapped into the next data symbol. Each octet (8-bit) results in two symbols. In total 16 data symbols are present in a symbol set.

Next the symbols are converted to chips (STC). Thus, redundancy is introduced in the data. The table below gives a possible implementation of symbol to chip mapping (in this example for the 2450 MHz and the 2380 MHz bands).

| Data symbol | Chip values ($c_0$ $c_1$ ... $c_{30}$ $c_{31}$) |
|---|---|
| 0 | 11011001110000110101001000101110 |
| 1 | 11101101100111000011010100100010 |
| 2 | 00101110110110011100001101010010 |
| 3 | 00100010110110110011100001101011 |
| 4 | 01010010001011101101100111000011 |
| 5 | 00110101001000101110110110011100 |
| 6 | 11000011010100100010111011011001 |
| 7 | 10011100001101010010001011101101 |
| 8 | 10001100100101100000011101111011 |
| 9 | 10111000110010010110000001110111 |
| 10 | 01111011100011001001011000000111 |
| 11 | 011 10111011100011001001011000000 |
| 12 | 00000111011110111000110010010110 |
| 13 | 01100000011101111011110001101001 |
| 14 | 10010110000001110111101110001100 |
| 15 | 11001001011000000111011110111000 |

The first 8 chip sequences actually are cyclic shifted versions of the first chip sequence. The last 8 chip sequences are cyclic shifted versions of the 9th chip sequence. So, 16 chip sequences actually are generated by 2 basic chip sequences, this will lead to strong interference when signals of different users collide/overlap. An interference example will be given below when discussing a 802.15.4 legacy receiver.

After the symbol to chip conversion the chip sequence is converted to a baseband I/Q sample sequence using a O-QPSK modulator (O-QPSK). Each data symbol may be represented by a 32-chip sequence. The 32 chips may be converted to 32 I/Q samples according to O-QPSK modulation defined in chapter 12.2.6 of the 802.15.4-2015 standard.

Next, the baseband I/Q sample is converted to a signal that will be transmitted via an antenna. Pulse shaping in accordance with chapter 12.2.6 of the 802.15.4-2015 standard is applied to generate an oversampled waveform. In the present example the 2M sample/s signal is 4 times oversampled to 8M sample/s (up sampling and pulse shaping module UP).

Figure 3:
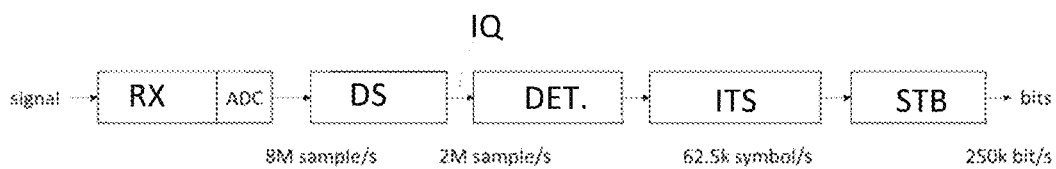
FIG. 3 shows a typical 802.15.4 legacy receiver.

A typical 802.15.4 legacy receiver executes the steps illustrated in FIG. 3. This receiver performs the reverse operation of the transmitter illustrated in FIG. 2.

The incoming signal is received by an analog receiver (RX) and converted to an I/Q sample by an ADC.

Next, the digital signal is synchronized and down sampled by a module (DS) which is connected with the ADC. This module (DS) receives the I/Q sample (oversampled) from the ADC, and searches the best sample location according to a pre-known signal piece, such as a preamble or target MAC address field, etc. The "best sample location" not only relates to which sample is the first sample of the desired signal but also to which sampling phase (one sample out of every 4 samples in the case of 4-time oversampling) is correct. With this information, decimation/down-sampling can be applied to obtain the baseband I/Q samples, which in this example has a rate of 2M samples per second.

In a next step the chip sequence is detected using a chip sequence detection module (DET.). The baseband I/Q samples, e.g. a sequence of 32 I/Q samples represents the received signal of the transmitted chip sequence. To detect (DET.) the index (0~15) of the transmitted chip sequence, the incoming I/Q sample sequence (length 32), is correlated with local O-QPSK modulated chip sequences (in total 16 sequences, and each sequence contains 32 I/Q samples). To determine the index i, following correlation test method may be used:

$$i = \operatorname*{argmax}_{i=0..15}\{s_i^H * r\}$$

wherein $s_i$ is a 32×1 vector:

$$s_i = \begin{bmatrix} s_{i\_0} \\ s_{i\_1} \\ \vdots \\ s_{i\_n} \end{bmatrix}$$

representing the $i^{th}$ chip sequence defined in the standard (modulated version); r is 32×1 vector representing synchronized incoming I/Q sample sequence. Superscript H means conjugate transpose.

Figure 4:
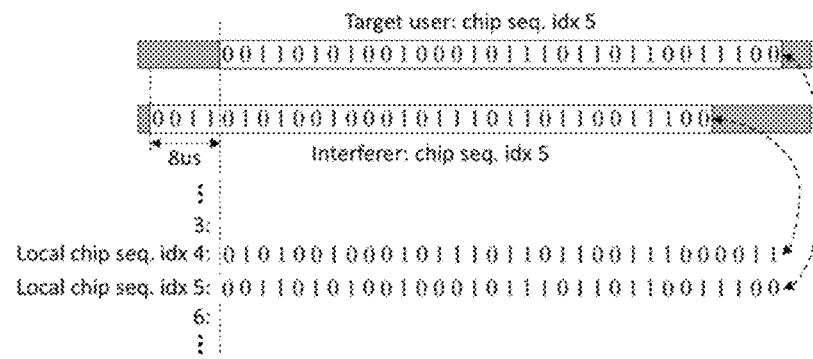
FIGS. 4 to 6 illustrate possible interferences between a target user and an interferer.

Because of the cyclic shifting relationship between chip sequences defined in the standard, the above correlation test will be unreliable if another time shifted chip sequence, belonging to another user, exists. For example, in FIG. 4 an interferer signal has a relative time difference around 8 μs (4 chips) compared to the signal of a target user, and both; the interferer and the target user, transmit chip sequence 5. When performing the correlation test for the target user, not only the local chip sequence 5 but also the local chip sequence 4 can generate a strong correlation value. This is illustrated in FIG. 4 wherein is shown that, as a result of the time difference between the interferer signal and the target user signal, at the start of the target user chip sequence, the interferer chip sequence starts as sequence 4 (non-complete) although interferer transmits chip sequence 5 as well.

When there is noise or interference, the wrong detection probability will be high, because the correlation value of chip sequence 4 is close to the strongest.

Figure 5:
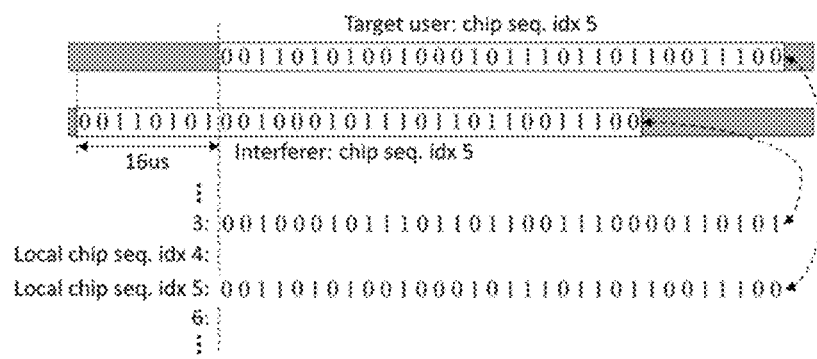
Figure 6:
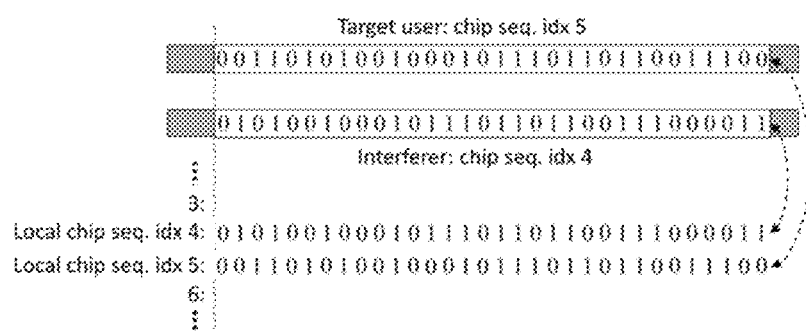

Following a similar analysis of the above case, there are two other interference cases that lead to ambiguity. These are illustrated in FIGS. 5 and 6.

Referring back to FIG. 3, the step after the chip sequence detection (DET.) is the conversion (ITS) of the detected sequence to a symbol. The data symbol (0~15), is actually the index of detected chip sequence.

In a next step the symbol is converted (STB) to a bit sequence. Each symbol thereby generates 4 bits.

In the analysis of the previous section, multi-user signals are Non-Orthogonal because there is only one set of chip sequence in the IEEE 802.15.4 standard and all users use the same sequence set for modulation instead of Multiple Accessing (MA). This is different from the traditional CDMA system, where individual users are assigned with different sequences for MA. Because of this, separation of different user signals becomes difficult for IEEE 802.15.4 concurrent transmission.

In embodiments of the present invention an antenna array is used to capture the spatial character of different users which, in real deployment, are usually located in different locations. The different spatial array responses will render the same set of chip sequence to different sets for different users at different locations.

Figure 7:
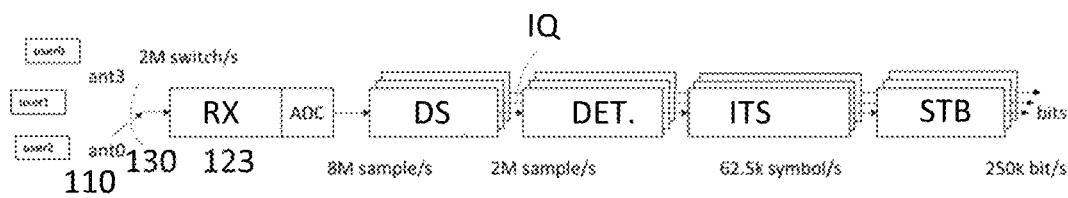
FIG. 7 schematically shows a receive configuration comprising switching antennas and a single RF receiver, in accordance with embodiments of the present invention.

In FIG. 7 is illustrated how this is achieved via switching antennas 110 and a single RF receiver 123 in accordance with embodiments of the present invention. In embodiments of the present invention, the antenna switching rate is the same as chip rate. In the example of FIG. 7, three users are transmitting concurrently, and the multi-user receiver is equipped with 4 switching antennas 110. The task of the multi-user receiver is to extract the bits of the different users from the multi-user superposed I/Q sample stream. In this example there are three separate baseband processing branches to extract bits of the three users. Each branch comprises a synchronization and down sample module (DS), a chip sequence detection module (DET.), a sequence index to symbol conversion module (ITS) and a symbol to bit module (STB).

Figure 8:
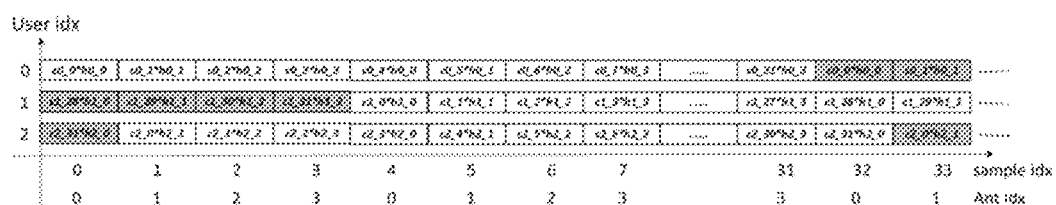
FIG. 8 illustrates a baseband signal model comprising superposed I/Q sample streams of 3 users detected at the input of a multi-user receiver, in accordance with embodiments of the present invention.

A baseband signal model comprising superposed I/Q sample streams of 3 users detected at the input of a multi-user receiver, in accordance with embodiments of the present invention, is depicted in FIG. 8. In this graph the Y axis indexes the user and the X axis indexes the received I/Q sample and the corresponding antenna. Because in general multi-user transmissions are asynchronous, at the receiver the signals from different users have different time shifts. Although the signal of different users is drawn separately with different user indexes in FIG. 8, actually they are superposed at the analog receiver in FIG. 7. The task of chip sequence detection comprises identifying different chip sequences transmitted by different users. In FIG. 8, the series of white blocks represent a complete chip sequence of a user, and the shaded blocks are chips from an adjacent symbol of the same user. The sample cn_j is the I/Q sample of the $n^{th}$ user's $j^{th}$ chip, where n={0,1,2} and j={0, 1, ..., 31}. hn_k is complex channel gain between the $n^{th}$ user and the $k^{th}$ antenna, where n={0,1,2}, k={0,1,2,3}. With this model, the chip sequence detection for user n will be:

$$i = \underset{i=0..15}{\mathrm{argmax}}\{s_{n\_i}^H * r_n\}$$

Where $r_n$ is a 32×1 vector:

$$r_n = \begin{bmatrix} r_{q(n)+0} \\ r_{q(n)+1} \\ \vdots \\ r_{q(n)+31} \end{bmatrix}$$

representing the corresponding segment of incoming I/Q sequence of user n. The index q(n) is the starting I/Q sample index of a chip sequence for user n. In the example depicted in FIG. 8, for user 0, q(0)=0, which means the I/Q sample indexes for a symbol are 0~31; for user 1, q(1)=4, which means the I/Q sample indexes for a symbol are 4~35; for user 2, q(2)=1 which means I/Q sample indexes for a symbol are 1~32. So, the segment $r_n$ contains a complete chip sequence from the $n^{th}$ user and interference from other users. $s_{n\_i}$ is not the standard chip sequence $s_i$ anymore, instead $s_{n\_i}$ is the antenna switching scrambled version of the original chip sequence:

$$s_{n\_i} = \begin{bmatrix} s_{i\_0} * h_{n\_[q(n)+0] \bmod 4} \\ s_{i\_1} * h_{n\_[q(n)+1] \bmod 4} \\ \vdots \\ s_{i\_n} * h_{n\_[q(n)+31] \bmod 4} \end{bmatrix}$$

where $h_{n\_k}$ is the complex channel gain between the $n^{th}$ user and the $k^{th}$ antenna; k=[q(n)+{0 ... 31}] mod 4 and mod means modulo operation; $h_{n\_k}$ is the unique spatial character captured by switching antenna. This spatial scrambling operation generates different chip sequence sets for different users, thus it reduces the multi-user interference which is very strong in a single antenna receiver as discussed before. In the above chip sequence detection model, it is assumed that at the point of "baseband I/Q sample" for each user the following information is known:

the correct starting time of its chip sequence;

the complex channel gain between the user and each switching antenna.

In embodiments of the present invention this information may be obtained by synchronization and channel estimation.

In general, the controller 140 of a multi-user access node according to embodiments of the present invention may be configured for separating collided chip sequences by correlating the incoming chip sequences with scrambled versions of the original chip sequences. Thereby, the scrambled versions are obtained from the spatial character and the applied scrambling sequence.

Figure 9:
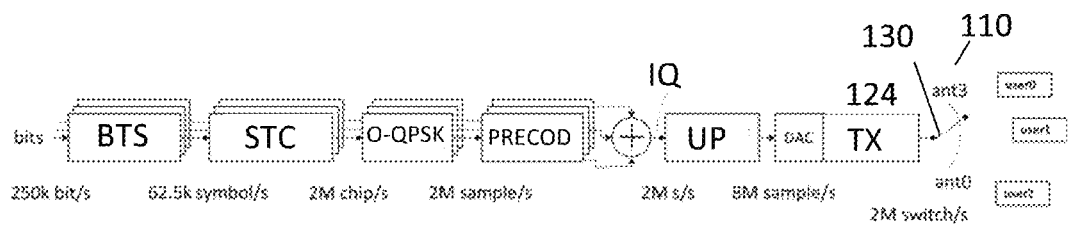
FIG. 9 schematically shows a multi-user transmitter, in accordance with embodiments of the present invention.
Figure 10:
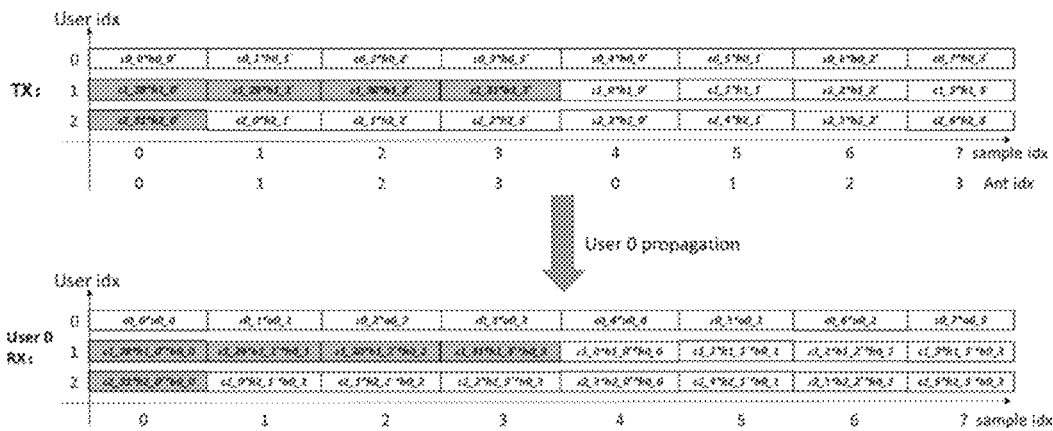
FIG. 10 illustrates a conjugate pre-coding example, in accordance with embodiments of the present invention.

A multi-user access node according to embodiments of the present invention may comprise a multi-user transmitter. In embodiments of the present invention the transmit chain comprises a pre-coding module configured for applying an inverse operation before transmitting the analog signal such that the spatial character of the different users is compensated for. An example of such a multi-user transmitter is schematically drawn in FIG. 9. It is configured for executing an inverse operation compared to the multi-user receiver illustrated in FIG. 7. It comprises a branch per user. Each branch comprises a Bit to symbol module (BTS), a symbol to chip module (STC), a O-QPSK modulator (O-QPSK), a pre-coding module (PREC), a combiner. The combined samples are baseband I/Q samples and are input of a up sample and pulse shaping module (UP) which connected with the DAC and analog transmitter (TX). The switch 130 connects the analog transmitter with one of the antennas 110. A multi-user transmitter according to embodiments of the present invention comprises a pre-coding module after each user's O-QPSK modulator. The pre-coding module is configured for pre-inversing the channel effect between the switching antenna and the target user so that the target user sees the correct chip sequences. A conjugate pre-coding example is illustrated in FIG. 10. In this example, c0_0*h0_0* is the channel conjugate pre-coding operation on a chip. c0_0 is the chip and h0_0 is the corresponding complex channel gain. This gain may be estimated during pre-processing steps of the multi-user receiver. The superscript * means the conjugate operation on a complex number. Because of pre-coding and channel effect, the user 0 only sees a real gain instead of a complex gain on the received chip sequence. The gain an_j=cn_j* cn_j*=abs (cn_j)^2. It is an advantage of embodiments of the present invention that with this real value gain for user 0, the legacy chip sequence detection will still be valid. It is, moreover, advantageous that, since other users' pre-coding doesn't match the user 0 propagation, their signals will have random a residual channel phase in a user 0 receiver and act like noise.

In embodiments of the present invention capturing the spatial character of the different users implies determining complex gains of channels between the users and the antennas. Synchronization of each user may be achieved by searching a unique sequence sent by the user. Also, the complex gains of the channels may be determined using this unique sequence. The unique sequence may for example be generated from the unique identity of that user, such as a MAC address, serial number or temporary assigned identity. The unique sequence of the different users may be obtained by the multi-user receiver during an initial procedure of non-concurrent transmission (e.g. an initial handshaking/discovery/registration procedure). Thus, the multi-user receiver can obtain the unique sequence of all users that will transmit concurrently.

This unique sequence may be used to assist in future synchronization during concurrent transmission.

In embodiments of the present invention multi-user receiver may be configured for searching the unique sequence of a specific user during the concurrent transmission phase.

The multi-user receiver may comprise a reference receiver chain and reference antenna to ease the synchronization and channel estimation during the concurrent transmission phase. The unique sequence of each user can be searched continuously via the reference antenna which may be dedicated for this purpose.

In embodiments of the present invention the controller 140 is configured for storing data (e.g. the I/Q samples) from the main transceiver 120 while determining the unique initialization chip sequence of each user. Thus, after identifying the starting time of the unique sequence of a specific user via the reference antenna, data (e.g. I/Q samples) of the same sequence have also been received via the switching antenna and are stored in the buffer. It is an advantage of embodiments of the present invention that this data can be used to capture the spatial character of the different users (estimate the channel between the user and each switching antenna).

Figure 11:
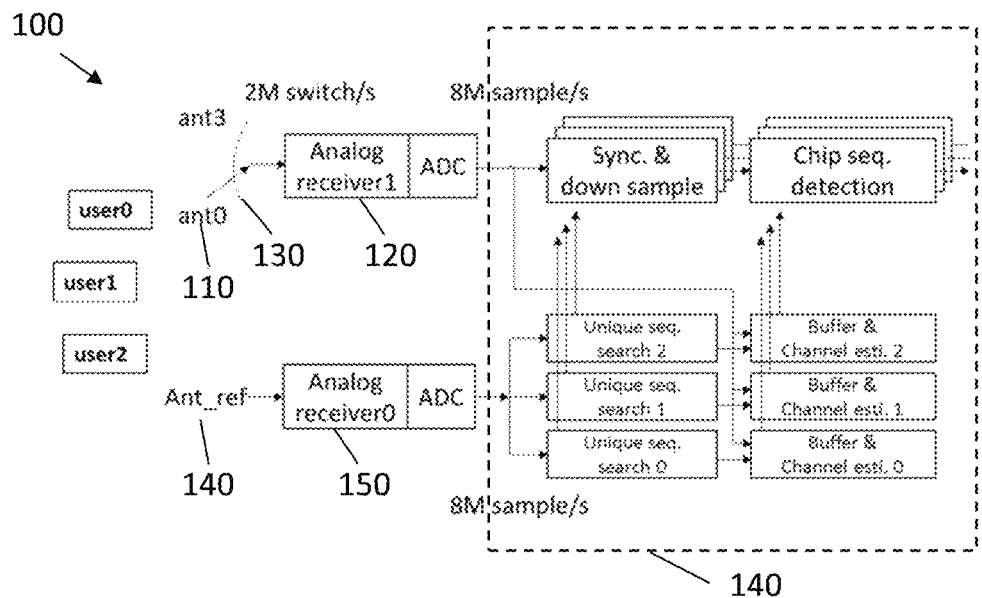
FIG. 11 shows a hardware architecture of an exemplary multi-user access node in accordance with embodiments of the present invention.

A possible implementation of such an embodiment is schematically illustrated by the architecture shown in FIG. 11. It shows a plurality of antennas (in order not to overload the picture only antennas ant0 and ant3 are shown instead of ant0, ant1, ant2, and ant3), a main transceiver 120, and a switch 130 for switching between the plurality of antennas. The controller 140 comprises a synchronization and down sampling unit at the output of the main transceiver and a chip sequence detection unit at the output of the synchronization and down sampling unit. It, moreover, shows a reference antenna 140, and a reference transceiver 150 connected to the reference antenna. The data from the reference transceiver is analyzed to find the unique initialization chip sequences 0, 1, and 2. While finding the unique initialization sequences the data from the main transceiver is buffered for doing the channel estimation for the different users.

Figure 12:
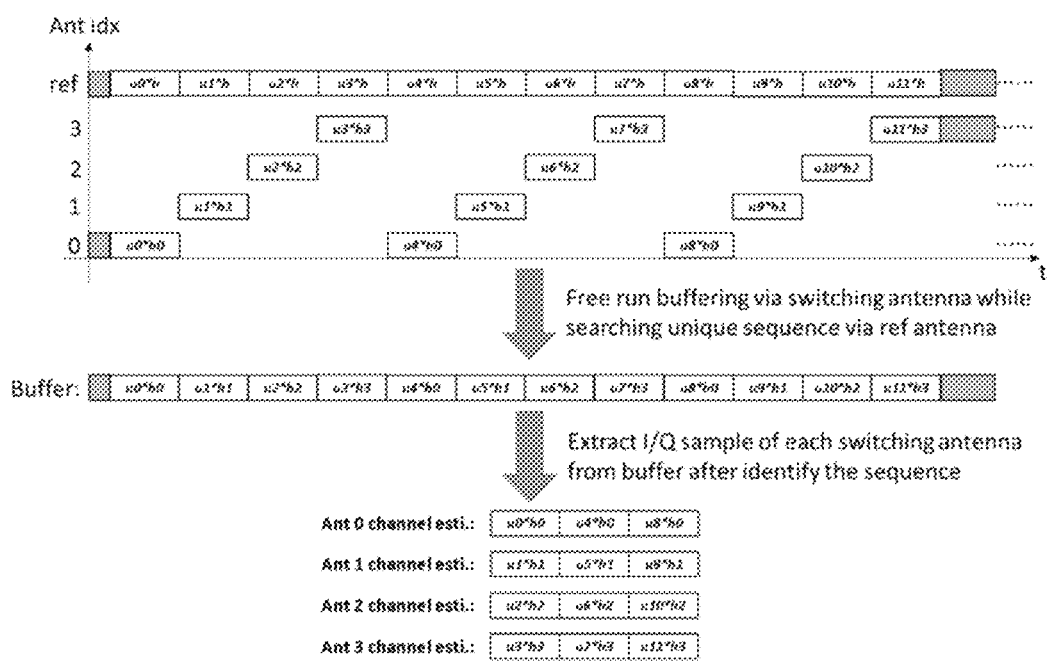
FIG. 12 shows how, in an exemplary embodiment of the present invention, the unique sequence of a user can be searched, and how the complex channel gain of the different channels can be estimated.

FIG. 12 shows how, in an exemplary embodiment of the present invention, the unique sequence of a user can be searched, and how the complex channel gain of the different channels can be estimated.

In FIG. 12, the length of the unique sequence is 12, i.e. the sequence is composed by 12 I/Q samples u0, u1, ... u11, which are known to the receiver. his complex channel gain of the reference antenna. Because h will never change during the packet period, the unique sequence searching can be done (for example, by applying a moving correlation between the incoming data stream (e.g. I/Q stream) and the local unique sequence without knowing h.

In the example h0-h3 are the complex channel gains of the switching antennas. In this example, 3 samples are captured for antenna 0 (u0*h0, u4*h0, u8*h0), so 3 channel estimations can be done. For each channel estimation, the captured sample can be modeled as r=u*h+n, where u is the known transmitted sample (for antenna 0, they are u0, u4, u8) of the unique sequence; h is the complex channel gain (to be estimated) between the antenna and the user; n is the noise (not shown in the figure). Estimation of h can be done by ĥ=r/u. Averaging multiple estimations can improve the estimation accuracy.

Because of the unique sequences, the synchronization and channel estimation procedure can be done for multiple users concurrently. Thus, a processing gain can be obtained.

The processing may be based on 2M sample/s which is the chip rate of 802.15.4 standard (O-QPSK 250 k bit/s mode). This is, however, only an example. In embodiments of the present invention, the front-end Analog-to-Digital Converter (ADC) of the transceiver (main/reference) may use a higher sampling rate, such as 8 Msamples/s and during synchronization (unique sequence search) the best sample (1 out of 4 for example) may be extracted. This decimation processing will generate data samples (e.g. I/Q samples) at 2M sample/s from the 8M sample/s of ADC.

If extra time consumption is acceptable, the controller 120 may be configured for determining the unique initialization chip sequence of each user from the digital signal from the main transceiver without switching the transceiver, followed by determining the spatial character of the different users by switching the main transceiver 120 between the plurality of antennas. Then the parallel reference receiver is not needed any more. Instead, the switching branch can work in non-switching mode firstly, after which it can start operating in switching mode.

If extra time consumption is acceptable, the parallel searching task performed by the parallel receiver can be serialized with NOMA detection.

In the SIC operation of a NOMA receiver, interference cancellation of the strong users improves the detection performance of the weak users. The information of some of the users may for example be detected, which may be followed by subtracting their reconstructed signals from the total received signal in order to improve the detection performance of the remaining users.

A multi-user access node according to embodiments of the present invention may be configured for performing successive interference cancellation. Successive interference cancellation allows to decode multi-user signals sequentially. In embodiments of the present invention this may be achieved by cancelling the user signal that has the strongest correlation even if there is a bit error, then in the next iteration the original user signal (canceled in previous iteration) is restored from a memory to be given more tries. This generates a better SIC performance without the aid of FEC. This is particularly advantageous for cases where FEC is not used.

Figure 13:
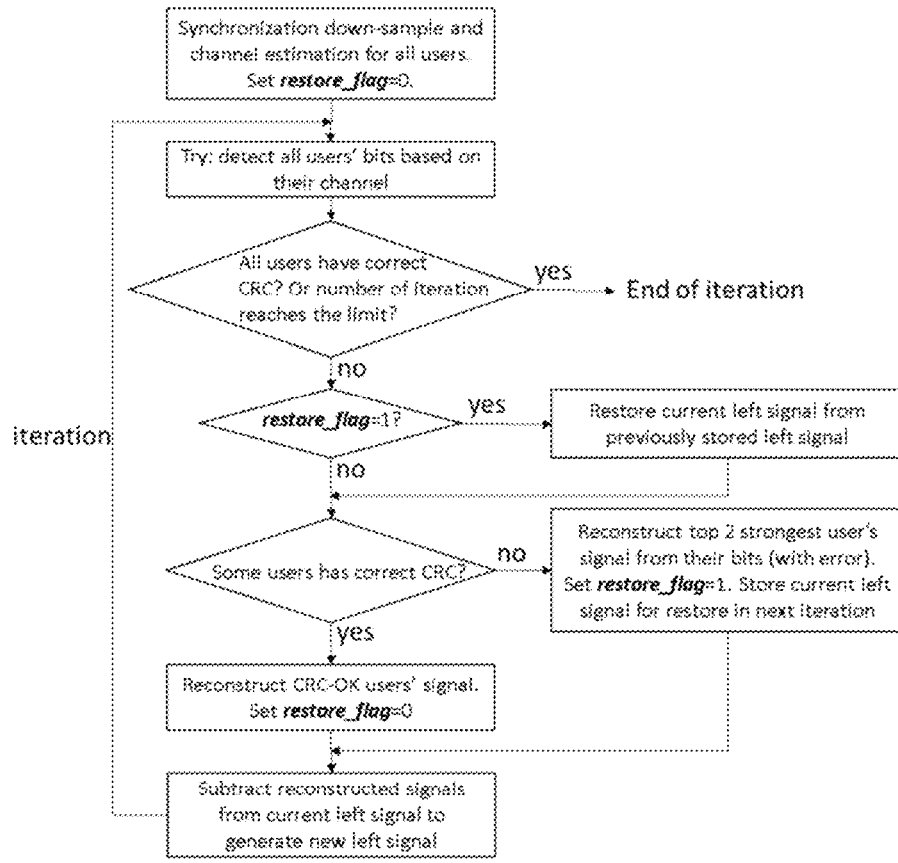
FIG. 13 shows an exemplary flow chart of a method implemented on a multi-user access node in accordance with embodiments of the present invention.

A multi-user access node according to embodiments of the present invention may for example be configured for performing the successive interference cancellation method as illustrated in FIG. 13. Such a method is, for example, applicable for a IEEE 802.15.4 multi-user receiver.

In the illustrated SIC iteration, if some decoded packets pass the CRC check, the corresponding signals will be reconstructed and subtracted. Even if there isn't any decoded packet passing CRC check, in embodiments of the present invention, the signal is reconstructed based on bits decoded from the signal that has strong correlation value, because that implies a high chance to have more correct bits. This is referred to as non-ideal reconstruction. If this happens in an iteration, the subtracted signal will be recovered in the next iteration by the inter-iteration store-restore operation (re-store flag in FIG. 13), so that more decoding attempts can be performed on the original signal. In this way, the chance of successful decoding is improved.

To increase the chip sequence detection reliability under strong interference, in embodiments of the present invention, two successive chip sequences can be detected together. For instance, originally the input I/Q sample sequence (length 32) is correlated with 16 local chip sequences to find out which sequence is transmitted. In the new method, the received I/Q sequence (length 64 instead of 32) is correlated with 256 (instead of 16) equivalent local chip sequences to find out which pair of chip sequences is transmitted. In this way, the correlation length is doubled, and thus a higher processing gain is achieved. The new 256 equivalent chip sequences are generated by cascading two original chip sequences:

$$b_k = \begin{bmatrix} s_i \\ s_j \end{bmatrix}, k = 16*i+j$$

where $s_x$, $x \in \{0, \ldots, 15\}$ represents the $x^{th}$ original chip sequence and $b_k$, $k \in \{0,255\}$ is the new equivalent chip sequence set.

In embodiments of the present invention the reference antenna may be used as an extra switching antenna. Since the reference antenna branch always works continuously, I/Q samples from the reference antenna can also be used in the multi-user receiver/transmitter signal processing model. In this case, the number of switching antenna becomes the actual number plus one.

The direction in which a user is located may be estimated using the obtained antenna response and calibration data of the antenna array. Since, in embodiments of the present invention, the antenna array response (complex channel gain between each antenna and user) can be estimated in the multi-user processing phase, it can be used to estimate the user's direction. To achieve this, antenna array responses in different directions are measured and stored in advance. For example, the antenna array response may be measured and stored for every 10 degree in azimuth direction. During the multi-user processing phase, a user's channel estimation result can be correlated with the pre-stored response in the different directions. The direction in which the user is located can be estimated as the direction that generates the highest correlation value.

In the next paragraphs the antenna switching based NOMA SIC algorithm, in accordance with embodiments of the present invention, is evaluated. Therefore, a numerical simulation is carried out involving a model of a uniform circular array which comprises 8 antennas.

Figure 14:
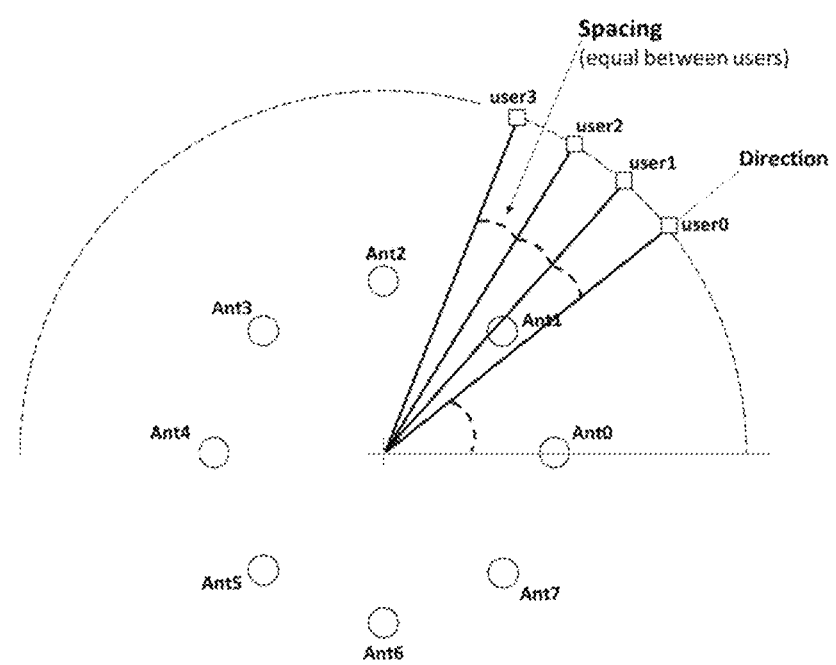
FIG. 14 shows a simulation topology of a user and antenna configuration in accordance with embodiments of the present invention.

The corresponding simulation topology is shown in FIG. 14. Multiple users are located at specific directions with equal angle spacing. In embodiments of the present invention the multiple complex channel gains may be calculated using Line of Sight (LoS) propagation model and far-field plane wave model. In this exemplary embodiment of the present invention the arrival times of signals from different users are distributed randomly in a time duration of a chip sequence (the time duration of the chip sequence in this example is 16 µs) to model the asynchronous behavior of concurrent users. The parameter N in the flow chart of FIG. 13 may for example be set to 2. In this example this gave the optimum performance. The invention is, however, not limited thereto. The maximum number of iterations may be set to the number of concurrent users. Each simulation result is the averaging of multiple simulation results on direction angles of 0, 9, 18, . . . , 45 degrees. Thanks to the symmetric array of this example, 0~360-degree ergodic tests are not necessary.

Figure 15:
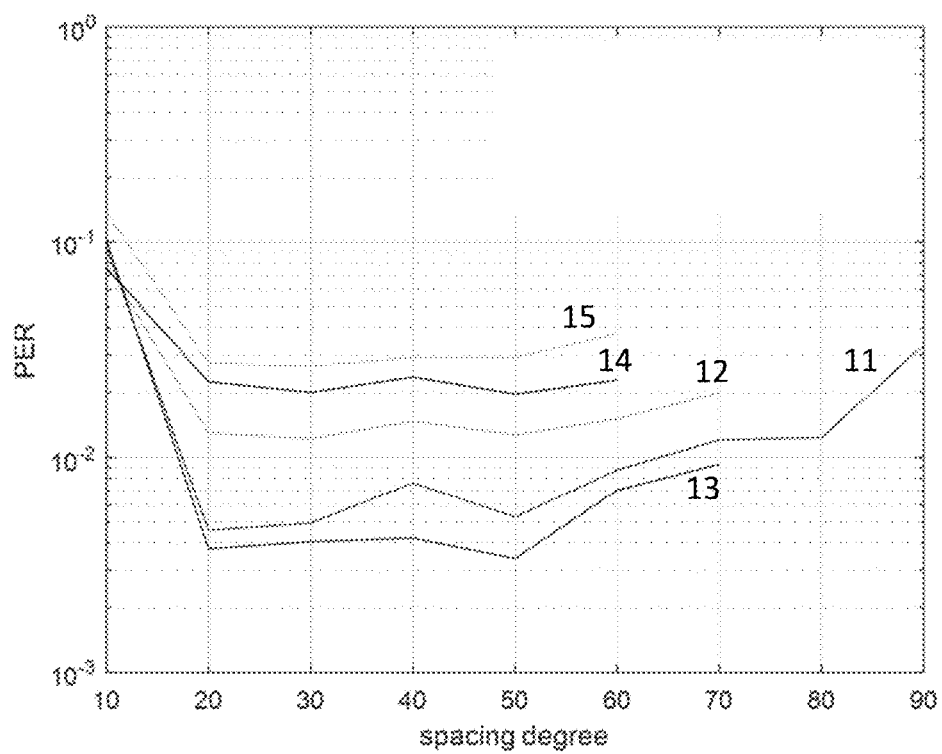
FIG. 15 to FIG. 20 show simulation results for a multi-user access node in accordance with embodiments of the present invention.
Figure 17:
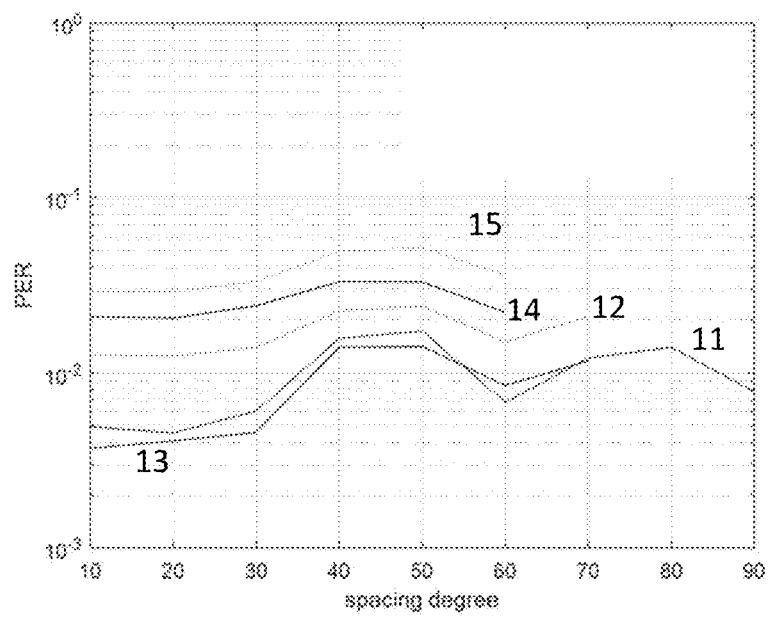
Figure 19:
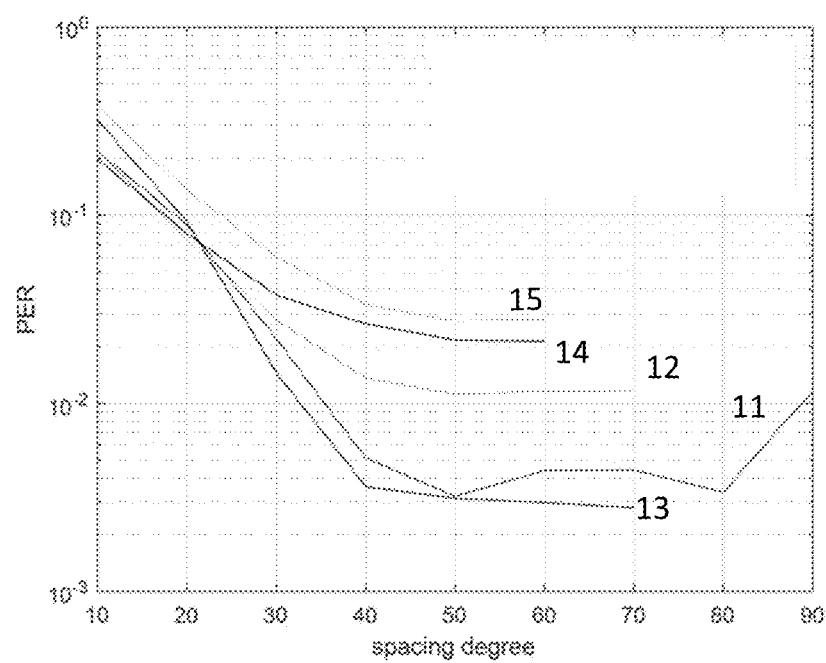

FIG. 15, FIG. 17, and FIG. 19 show the simulated PER (Packet Error Rate) results for different array diameters, number of users, spacing angle, detection method and power difference.

Figure 16:
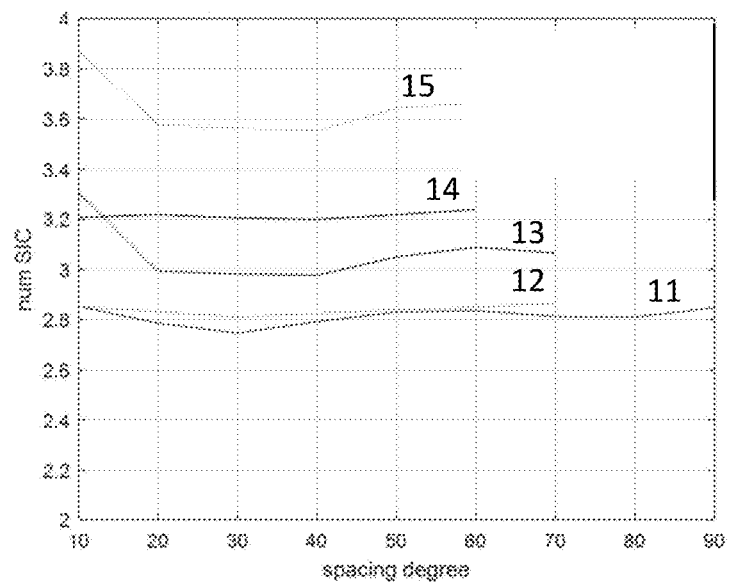
Figure 18:
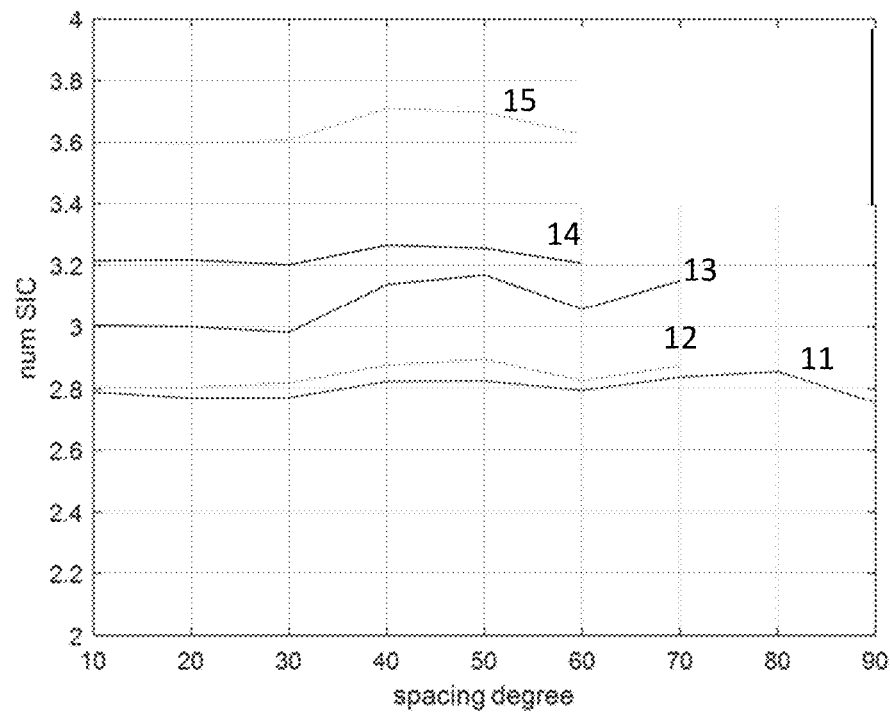
Figure 20:
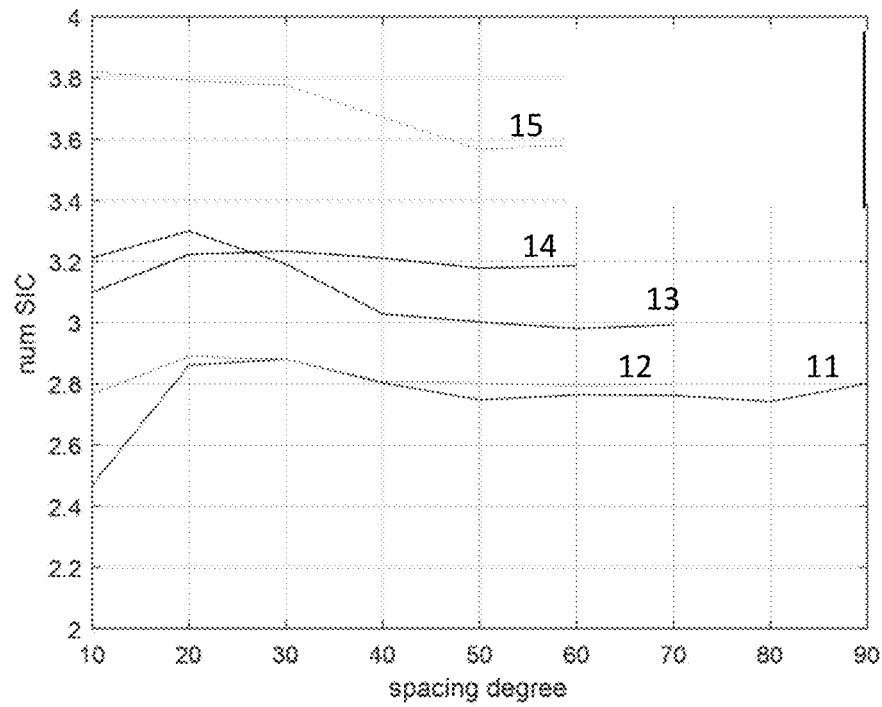

FIG. 16, FIG. 18 and FIG. 20 show the average number of iterations in a multi-user SIC receiver in accordance with embodiments of the present invention. The number of iterations is between 2 and 4.

FIG. 15 and FIG. 16 are the simulation results for an 8-antenna circular array configuration with a diameter of 16 cm.

FIG. 17 and FIG. 18 are the simulation results for an 8-antenna circular array configuration with a diameter of 32 cm.

FIG. 19 and FIG. 20 are the simulation results for an 8-antenna circular array configuration with a diameter of 8 cm.

In the different figures curves 11 are the simulations results for a configuration with 4 users, single chip sequence detection, and a received multi-user signal strength (relative level) which is substantially 0 dB.

Curves 12 are the simulations results for a configuration with 5 users, single chip sequence detection, and a received multi-user signal strength (relative level) which is distributed randomly between 0 dB to 10 dB.

Curves 13 are the simulations results for a configuration with 5 users, dual chip sequence detection, and a received multi-user signal strength (relative level) which is substantially 0 dB.

Curves 14 are the simulations results for a configuration with 6 users, single chip sequence detection, and a received multi-user signal strength (relative level) which is distributed randomly between 0 dB to 16 dB.

Curves 15 are the simulations results for a configuration with 6 users, dual chip sequence detection, and a received multi-user signal strength (relative level) which is distributed randomly between 0 dB to 6 dB.

The larger the power difference value, the bigger the chance to have a stronger user for the successful decoding in the $1^{st}$ SIC iteration. Zero dB means the worst case where all users generate the same received power at the multi-user receiver, according to embodiments of the present invention. This is confirmed in the simulation results. A bigger user power difference supports more concurrent users. Five users can transmit concurrently achieving 1% PER under the worst case of 0 dB power difference. When the array diameter is 16 cm, the spacing between users is preferably not smaller than 20 degrees. With a 32 cm diameter array, the spacing angle can even be decreased to 10 degrees.

By scheduling the different users, users may be selected with very different received signal strengths for concurrent transmission in a traditional NOMA design, so that the successful rate of the $1^{st}$ iteration can be improved by decoding the strongest user firstly. This scheduling, however, needs extra signaling overhead. In embodiments of the present invention the multi-user RF receiver may be configured for supporting the expected dynamic range between signals from the different users. Also, the resolution of the Analog-to-Digital Converter (ADC) may be high enough to support the expected dynamic range between signals from the different users. This kind of high-quality hardware could lead to significant increment in cost and power consumption.

In order to avoid this dynamic range issue, power control may be implemented. The purpose of power control in an IoT system is having the minimum required received power (right above the sensitivity level) at the receiver, so that user transmitting power can be saved and potential interference can be decreased. This equal received power at receiver leads to the worst case for SIC, as explained above, because it is difficult to find a user with high Signal to Interference and Noise Radio (SINR) for the $1^{st}$ iteration. It is an advantage of a multi-user RF receiver in accordance with embodiments of the present invention that they work well under this worst condition ("0 dB power diff" in simulation), thus complicated user scheduling is not necessary in a scheme according to embodiments of the present invention.

The previous description focuses on the case where multiple users transmit to one receiver concurrently. In embodiments of the present invention the concurrent transmission may also be implemented in the downlink: from one transmitter to multiple users. Thanks to the half-duplex mode, the channel estimation result after the calibration procedure in the uplink is also valid in the downlink. There are two options to use the channel information in downlink operation.

In embodiments of the present invention the transmitter may pre-compensate the channel gain for each user's receiver before transmission.

Alternatively, in embodiments of the present invention the receiver may use the channel character, when performing chip sequence detection just like multiple parallel chip sequence detections in a multi-user receiver. In downlink operation, a SIC algorithm may run in each user's receiver. To get user's own bits in its receiver, other users' bits might need to be decoded during SIC iteration.

In summary, typical MIMO solutions in Wi-Fi, 4G and 5G involve full-time spatial sampling by many parallel antennas and RF transceivers, which are costly and power hungry. By complicated scheduling, different physical layer bit rate can fit into the capacity of different spatial streams. MIMO and NOMA scheme were researched for an IoT system like IEEE 802.15.4, and some benefits are shown. However, in those works, each antenna has a dedicated RF transceiver. A low power IoT system has a fixed physical layer bit rate and is sensitive to cost/power-consumption.

In embodiments of the present invention a single RF transceiver is switching between passive antennas, and digital processing handles concurrent transmission. This choice is particularly advantageous because RF/analog IC never scale as efficient as digital IC (Moore's law), and passive antennas only add minor cost. So, it will be a cost and power effective solution. Also, thanks to more and more powerful digital processing capability, SIC won't involve too much latency to the low data rate IoT system.

In traditional NOMA design, users need to be selected carefully to help the SIC operation as explained before. To achieve this, keep-alive close-loop signaling/control is used in a typical NOMA system. While, in embodiments of the present invention, no user power scheduling is required, and still a good performance can be obtained, even in the worst case. It is thereby advantageous that the signaling can be reduced. This signaling less design could ease the application of a scheme, according to embodiments of the present invention, to a light weight IoT system, where the mode of "occasionally transmit then long sleep" is preferred.

It is an advantage of embodiments of the present invention that it enables multi-user concurrent transmission. It is an advantage of embodiments of the present invention that they are compatible with the IEEE 802.15.4 physical layer and that a multi-user receiver in accordance with embodiments of the present invention can work with legacy IEEE 802.15.4 compliant sensor nodes. It means that only the gateway of an already deployed IoT network needs to be upgraded to improve the network throughput and latency performance.

It is an advantage of embodiments of the present invention that the antenna switching rate is the same as the baseband rate (chip rate 2M in IEEE 802.15.4 250 k bit/s mode for example). So, the RF transceiver, according to embodiments of the present invention, works in a similar bandwidth configuration as the traditional IEEE 802.15.4 transceiver, and the issue of multichannel aliasing interference does not exist.

Embodiments of the present invention relate to a hardware efficient NOMA scheme is for concurrent transmission in low power IoT system, such as IEEE 802.15.4. These methods allow to improve the throughput and latency performance of the network.

In embodiments of the present invention a single RF transceiver together with switching antennas are used to capture the spatial character of different IoT users at different locations. In embodiments of the present invention a SIC algorithm is designed to separate multi-user signals utilizing their different spatial characteristics.

Simulation shows that at least 5 users can transmit concurrently and be demodulated successfully at a multi-user SIC receiver, in accordance with embodiments of the present invention, equipped with a 16 cm 8-antenna array.

The digital processing of the signals may be implemented on a processor, ASIC or FPGA. Although the processing complexity may increase linearly with the number of concurrent users, this increase in the baseband complexity of the MIMO node can be tackled by the IC process or ASIC/FPGA. In a massive IoT system, the gateway and frequency/channel resources are the bottleneck. It is an advantage of a multi-user access node according to embodiments of the present invention that it utilizes digital IC/ASIC/FPGA processing to boost the IoT system capacity and lower the latency.

A multi-user node according to embodiments of the present invention may be used as part of an IoT gateway for low latency and high-capacity operation with legacy sensor nodes in a crowded spectrum.

A multi-user node according to embodiments of the present invention may be used as part of an IoT node with MIMO capability. It can act as a super node in a mesh/ad-hoc network to bridge multiple links.

A multi-user node according to embodiments of the present invention may be used in a network, where random access and potential collision could happen (e.g. the initial random access phase in 4G, 5G).

In a second aspect embodiments of the present invention relate to a method for receiving concurrent signals from different users wherein the signals are carrying chip sequences at a baseband rate and wherein redundancy is present in the chip sequences. The method comprises: switching a transceiver between a plurality of antennas to capture a spatial character of the different users based on unique initialization sequences from the different users, separating collided chip sequences transmitted by different users by switching the transceiver between the plurality of antennas according to a scrambling sequence and by using the spatial character of the different users in combination with the applied scrambling sequence.

Methods in accordance with embodiments of the present invention may additionally comprise the steps which are elaborated when explaining the multi-user access node according to the first aspect of the present invention.

A multi-user access node 100 according to embodiments of the present invention may be implemented as a distributed architecture comprising a central baseband and a plurality of transceivers connected to the switching antennas 110. The distributed system comprises a central baseband and plurality of transceivers 120 connected to switching antenna(s) and a switch for switching the central baseband between the plurality of transceivers.

Figure 21:
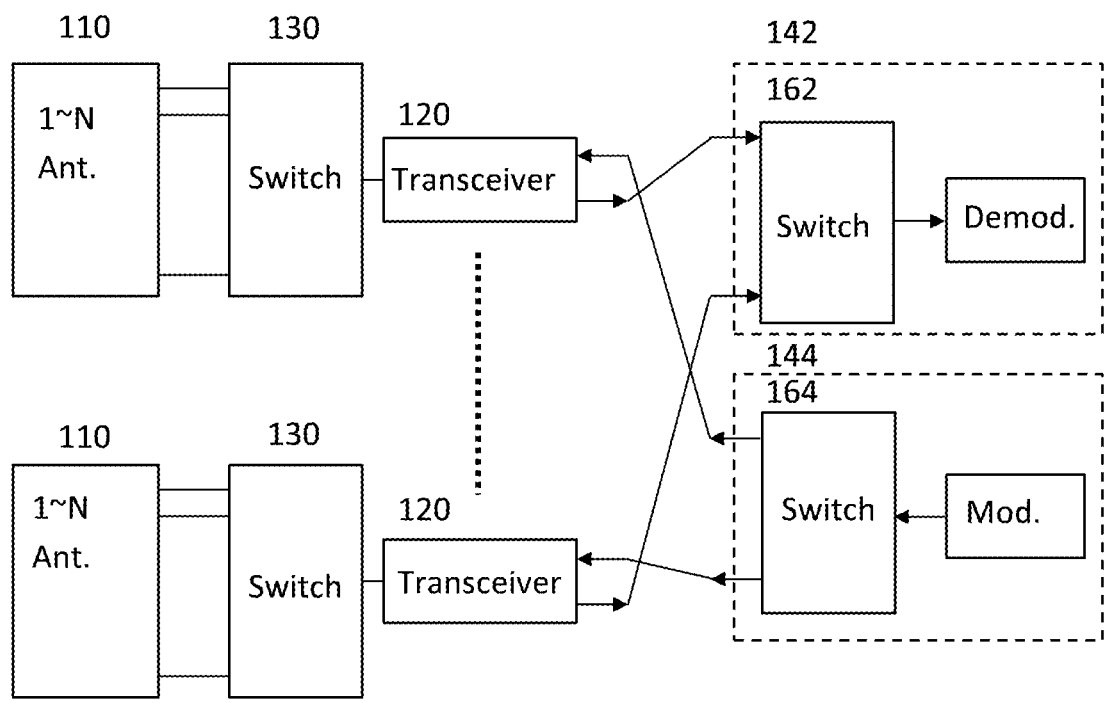
FIG. 21 shows a schematic drawing of a distributed architecture of a multi-user access node in accordance with embodiments of the present invention.

In that case the plurality of antennas 120 may be subdivided in different sets. The multi-user access node comprising a main transceiver 120 and a switch 130 per set of antennas 110. An example of such a distributed architecture is illustrated in FIG. 21. Each switch 130 is configured for switching its corresponding main transceiver 120 between the plurality of antennas of the corresponding set.

The multi-user access demodulator 142 is configured for receiving and demodulating the digital signal from the analog to digital converter of at least one of the transceivers 120. It therefore comprises a switch 162 for switching between the transceivers 120, such that the digital signal from the connected transceiver 120 can be demodulated.

The multi-user modulator 144 is configured for receiving a chip sequence for the different users and for modulating the signal and for sending the modulated signal to the digital to analog converter of at least one of the transceivers 120. It therefore comprises a switch 164 for switching the modulated signal to one of the transceivers 120.

The invention claimed is:

1. A multi-user access node for receiving concurrent signals from different users, wherein the concurrent signals are carrying chip sequences at a baseband rate and wherein redundancy is present in the chip sequences, the multi-user access node comprising:
a plurality of antennas organized in an antenna configuration,
a main transceiver comprising an analog receiver and an analog to digital converter for converting an incoming signal into a digital signal which comprises incoming chip sequences,
a switch for switching the main transceiver between the plurality of antennas, and
a controller configured for:
initializing the multi-user access node by switching the main transceiver between the plurality of antennas to capture a spatial character of the different users based on unique initialization chip sequences from the different users, and
separating collided chip sequences transmitted by the different users by switching the main transceiver between the plurality of antennas according to an applied scrambling sequence and by utilizing the spatial character of the different users in combination with the applied scrambling sequence.

2. The multi-user access node according to claim 1, wherein the switching is done at the baseband rate.

3. The multi-user access node according to claim 1, the multi-user access node further comprising a reference receive chain, comprising a reference antenna and a reference transceiver which is permanently connected with the reference antenna, the reference transceiver comprising an analog receiver and an analog to digital converter for converting an incoming signal into a digital signal.

4. The multi-user access node according to claim 1, wherein at least one transceiver comprises a transmit chain which at least comprises a digital to analog converter for converting a digital signal, into an analog signal and a transmitter for transmitting the analog signal and a time division duplexing switch for either connecting the transmitter or a receiver to an antenna, wherein the digital signal comprises a modulated chip sequence.

5. The multi-user access node according to claim 4, wherein the controller is configured for generating a time division duplexing control signal for controlling the time division duplexing switch.

6. The multi-user access node according to claim 4, the multi-user access node further comprising a multiuser modulator configured for receiving a chip sequence for the different users and for modulating a signal and for sending the modulated signal to the digital to analog converter of the at least one transceiver.

7. The multi-user access node according to claim 1, the multi-user access node further comprising a multiuser demodulator configured for receiving the digital signal from the analog to digital converter of at least one transceiver and for demodulating the digital signal.

8. The multi-user access node according to claim 1, wherein the controller is configured for separating collided chip sequences by correlating the incoming chip sequences with scrambled versions of original chip sequences, wherein the scrambled versions are obtained from the spatial character and the applied scrambling sequence.

9. The multi-user access node according to claim 4, the transmit chain further comprising a pre-coding module configured for applying an inverse operation before transmitting the analog signal in a manner that the spatial character of the different users is compensated for.

10. The multi-user access node according to claim 1, wherein the controller is configured for performing an initial procedure to determine the unique initialization chip sequence of each user.

11. The multi-user access node according to claim 3, wherein the controller is configured for determining the unique initialization chip sequence of each user from the digital signal from the reference receive chain.

12. The multi-user access node according to claim 11, wherein the controller is configured for storing data from the main transceiver while determining the unique initialization chip sequence of each user.

13. The multi-user access node according to claim 10, wherein the controller is configured for determining the unique initialization chip sequence of each user from the digital signal from the main transceiver without switching transceivers, followed by determining the spatial character of the different users by switching the main transceiver between the plurality of antennas.

14. The multi-user access node according to claim 1, wherein the controller is configured for performing successive interference cancellation by subtracting a reconstructed signal of one or more users from the incoming signal.

15. A method for receiving concurrent signals from different users, wherein the concurrent signals are carrying chip sequences at a baseband rate and wherein redundancy is present in the chip sequences, the method comprising:

switching a transceiver between a plurality of antennas to capture a spatial character of the different users based on unique initialization sequences from the different users, and separating collided chip sequences transmitted by the different users by switching the transceiver between the plurality of antennas according to an applied scrambling sequence and by utilizing the spatial character of the different users in combination with the applied scrambling sequence.

* * * * *